United States Patent [19]

Andreani et al.

[11] 4,156,629
[45] May 29, 1979

[54] PROCESS AND APPARATUS FOR COOLING THE WALL OF THE VESSEL OF A FAST NEUTRON REACTOR

[75] Inventors: André Andreani; René Chevallier, both of Grenoble; Paul Lambert, Echirolles, all of France

[73] Assignee: Commissariat a l'Energie Atomique, Paris, France

[21] Appl. No.: 894,377

[22] Filed: Apr. 7, 1978

[30] Foreign Application Priority Data

Apr. 19, 1977 [FR] France .............................. 77 11664

[51] Int. Cl.² ........................ G21C 11/00; G21C 15/00
[52] U.S. Cl. ........................................ 176/40; 176/38; 176/65
[58] Field of Search ........................ 176/40, 65, 38, 87

[56] References Cited

U.S. PATENT DOCUMENTS

| | | | |
|---|---|---|---|
| 3,962,032 | 6/1976 | Berniolles et al. | 176/40 |
| 4,032,399 | 6/1977 | Defauchy et al. | 176/65 |
| 4,056,438 | 11/1977 | Gama et al. | 176/65 |

FOREIGN PATENT DOCUMENTS 1207036 9/1970 United Kingdom ...................... 176/87

Primary Examiner—Harvey E. Behrend
Attorney, Agent, or Firm—Cameron, Kerkam, Sutton, Stowell & Stowell

[57] ABSTRACT

Process and apparatus for cooling the wall of the vessel of a fast neutron reactor comprising a main vessel which surrounds a second vessel containing the core and separating a volume of liquid metal contained in the main vessel into two regions called the hot collector and the cold collector respectively. The liquid metal drawn into the cold collector and passed through the core to the hot collector is circulated by means of pumps distributed around the core. A baffle and a counter-baffle are arranged concentrically to the main vessel wall and respectively define a first and second annular space issuing into the cold collector. The first annular space is traversed by a tapped flow of cooling liquid metal circulating from bottom to top in the first space in contact with the main vessel wall up to an upper constant level adjacent to the edge of the baffle. The liquid metal is poured into the second space up to a lower level corresponding to the free surface of the cold collector via helical channels in contact with the baffle wall directed towards the inside of the main vessel.

8 Claims, 5 Drawing Figures

PROCESS AND APPARATUS FOR COOLING THE WALL OF THE VESSEL OF A FAST NEUTRON REACTOR

BACKGROUND OF THE INVENTION

The present invention relates to nuclear reactors whose core is cooled by a liquid metal generally constituted by sodium contained in a vessel having a vertical axis and open at its upper end, the invention relating more specifically to fast neutron reactors.

In the classic design of such reactors, the core and the liquid sodium volume which cools the same are located in a vessel having a vertical axis and which is open at its upper end, being suspended beneath a thick protective slab which seals the vessel, whereby passages are provided within the same to give access to the core or to other components necessary for operation such as exchangers and pumps carried by the slab and distributed about the core. These components ensure on the one hand the transfer of the calories absorbed by the liquid metal after traversing the core and on the other the continuous circulation thereof. Advantageously the core is itself placed in a second vessel, called the inner vessel, which separates the liquid metal volume in the first vessel, called the main vessel, into two regions respectively called the hot collector and the cold collector. The hot collector collects the liquid metal when it leaves the core and after said liquid metal has been cooled by passing through exchangers it is collected in the cold collector and then taken up by circulating pumps which return it under an appropriate pressure to the reactor core in accordance with a continuous cycle.

According to another known arrangement the core formed by the juxtapositioning of fuel assemblies rests on a supporting member constituted by two plates or supporting grids having cavities in which vertically engage the feet of said assemblies. The pumps deliver the cold liquid metal to the supporting member and the junction between the feet of the assemblies and said member a leakage flow is provided which is small compared with the main flow passing through the assemblies for ensuring the cooling thereof. This tapped flow is recovered beneath the supporting member of the core and passes to an annular space, defined between the inner wall of the main vessel and a baffle which is parallel thereto where it circulates and cools the side wall of the vessel before being returned to the cold collector in which it mixes with the remainder of the liquid metal volume. The leakage flow can be returned to the cold collector either by reversal above the upper edge of the baffle with a return between said baffle and a parallel counter-baffle, or by flowing freely over the same edge into the collector.

In both these solutions the cooling liquid sodium in the upper open part of the vessel is in contact with a neutral covering gas above the liquid metal level in the vessel beneath the slab which seals the reactor. Thus difficulties can occur during the variation in the level of the free sodium in the vessel. Thus, if it is arranged so that the removed liquid sodium reversal level is permanently maintained below that existing in the vessel, there is no risk of entrainment of said covering gas, whereas with low level operation of the reactor when the removed liquid sodium level is maximum, stagnant uncooled layers are formed in the upper part of the vessel between the latter and the baffle. However, when it is arranged that the overflow level of the liquid sodium removed is permanently above the maximum level in the vessel, the cooling of the latter is ensured under all operating conditions but the overflow obtained may then cause a disadvantageous entrainment of the covering gas.

BRIEF SUMMARY OF THE INVENTION

The present invention relates to a process and to an apparatus ensuring a homogeneous effective cooling of the upper part of the vessel of a fast neutron reactor by removing a fraction of the cooling liquid metal, no matter what the level in the vessel and without any formation of hot pockets or entrainment of the covering gas.

The present invention relates to a process for cooling the wall of a vessel, called the main vessel, of a fast neutron nuclear reactor which surrounds a second vessel, called the inner vessel, containing the core and whereby a volume of liquid metal contained in the main vessel is separated into two regions called respectively the hot collector and the cold collector, whereby the liquid metal drawn into the cold collector and passed through the core into the hot collector is circulated by means of pumps distributed about the core, a baffle and a counter-baffle being positioned concentrically to said wall of the main vessel and define respectively a first and second annular space which issue into the cold collector, the first annular space being traversed by a flow which is tapped from the cooling liquid metal circulating from bottom to top in the first space in contact with the wall of the main vessel up to a constant upper level close to the edge of said baffle, wherein the liquid metal is poured into the second annular space up to a lower level corresponding to the free surface of the cold collector via means which are in contact with the wall of the baffle directed towards the inside of the main vessel.

Thus, despite variations in the operating conditions of the reactor, the invention makes it possible to maintain a constant level of the liquid metal in contact with the wall of the main vessel within the first annular space. This is brought about without causing the entrainment of the covering gas in the liquid metal flowing into the second annular space.

The invention also relates to an apparatus for performing this process, wherein the said means are constituted by helical channels which can be fixed to the baffle wall or the baffle can itself comprise a lateral wall of the said channels. Optionally the channels may have obstacles in the outflow path of the liquid metal into the second annular space. These obstacles can be formed by a metallic or mineral material in the form of gauzes or fabrics, or in the form of perforated or unperforated shaped members or in the form of particles such as balls or pellets.

BRIEF DESCRIPTION OF THE DRAWINGS

Other features and advantages of the invention can be gathered from the following non-limitative description of a preferred embodiment, with reference to the attached drawings, wherein show.

DETAILED DESCRIPTION OF THE PREFERRED EMBODIMENTS

Figure 1:
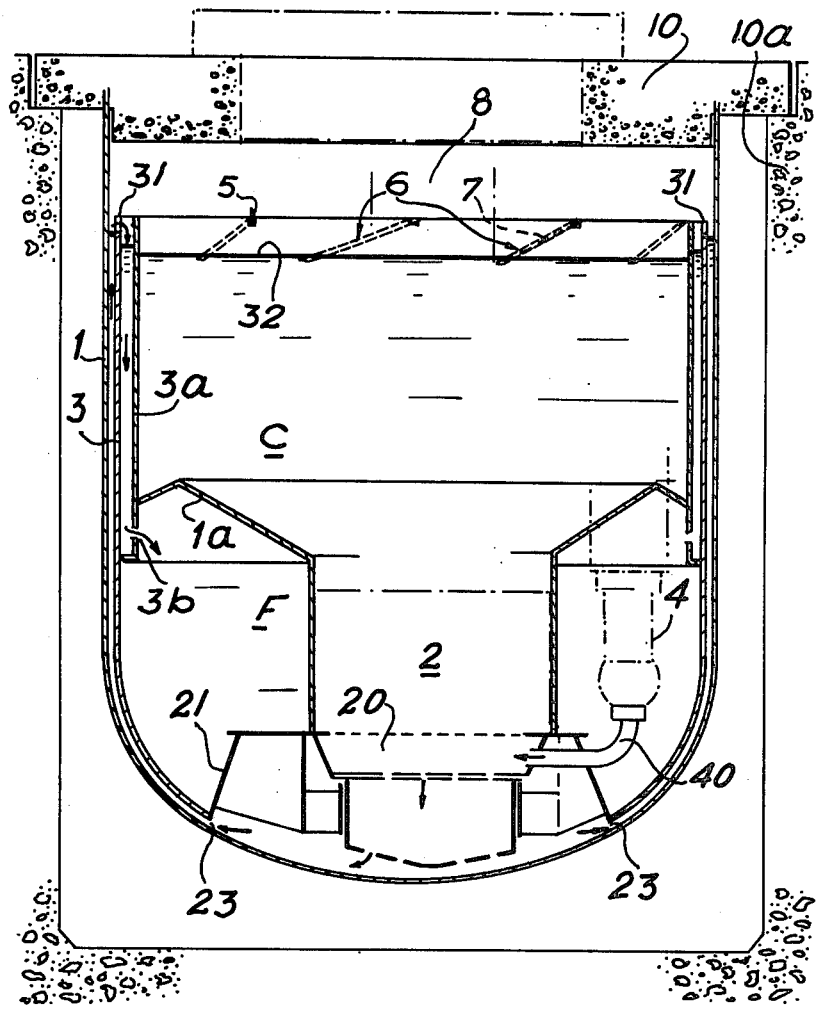
FIG. 1, a simplified diagrammatic sectional view of a nuclear reactor equipped with an apparatus according to the invention.

In FIG. 1 reference numeral 1 designates the main vessel having a vertical axis of a fast neutron nuclear reactor shown in highly diagrammatic form. The upper part of said vessel is suspended beneath a slab 10 sealing a concrete caisson 10a containing the complete installation. In the lower part of the reactor core 2 is provided a collector or supply chamber 20 which via a supporting member 21 rests on the substantially hemispherical base of vessel 1. An envelope or baffle 3 is disposed concentrically in main vessel 1 and extends from the bottom of the supporting member 21 up to a given distance from the upper end of the vessel suspended beneath the sealing slab 10. The upper edge of baffle 3 is given the reference numeral 31.

Reactor core 2 is submerged in a mass of liquid metal which is normally constituted by sodium, and which rises in the vessel to a level beneath the baffle given the reference numeral 32 which is below that of edge 31. Within vessel 1 the liquid sodium volume is separated into two parts due to the presence of an inner vessel 1a which on either side of the latter defines two regions respectively designated by the letters F and C. Region C located above the core forms a collector which collects the hot liquid sodium which has absorbed calories on passing through the core, whilst region F positioned on the other side of inner vessel 1a collects the sodium which has cooled after passing through the not shown exchangers. This cooled sodium is taken up by at least one circulating pump 4 which, by means of a pipe 40, returns it to collector 20 beneath the core for a further passage through the latter.

Part of the cooling sodium from collector 20 flows into supporting member 21 and then after passing through holes 23 made in the bottom of said member flows into a first annular space defined between the inner part of main vessel 1 and the outer wall of baffle 3. The flow of the thus removed cold sodium is delivered to the vicinity of the upper edge 31 of the baffle or to a higher level than that 32 reached by the sodium in collector C.

According to the invention, helical channels 6 are positioned against the inner surface of baffle 3 and permit the sodium coming from the first annular space between vessel 1 and baffle 3 to flow into the same after passing over a threshold 5 at the upper end of each of the channels. The sodium can then flow into a second annular space which is concentric to the first and defined between baffle 3 and a counter-baffle 3a which is parallel and coaxial to baffle 3. The sodium which is thus poured against the wall of baffle 3 ensures the cooling of the latter and then flows out in the lower part of the second annular space before returning to collector F through the outlet ports 3b.

If desired, obstacles 7 are placed along the channels 6 whereby the thresholds 5 provided in the upper part of said channels are appropriately distributed along the periphery of baffle 3. As a result the outflow speed of the sodium poured into the channels always remains low and there is no possibility of entraining the covering gas 8 filling the region defined between slab 10 and free surface 32 of the sodium in the vessel.

Figure 2:
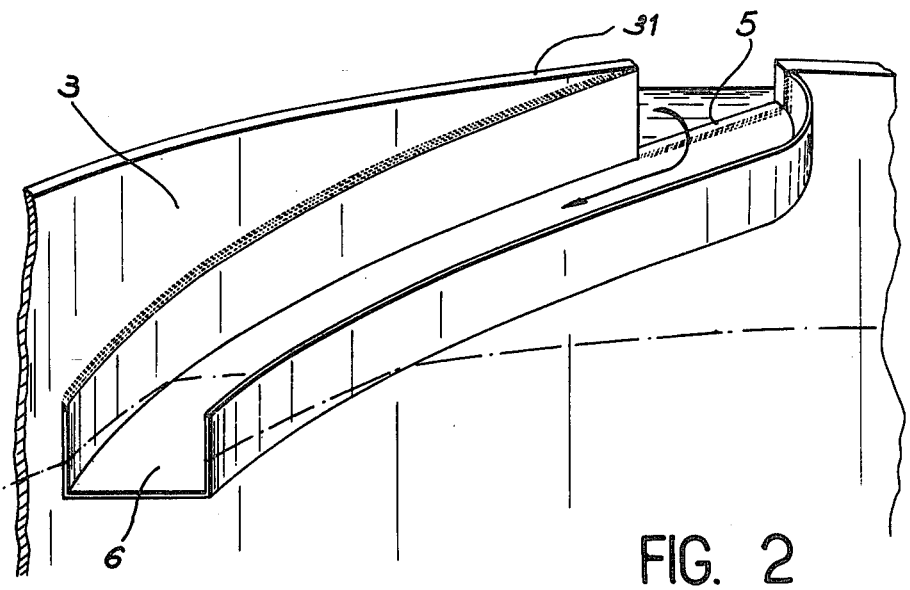
FIG. 2, a detail of a pouring channel.

FIG. 2 shows a channel 6 comprising a metal sheet with a U-shaped cross-section, said channel having a helical configuration. A side wall of the channel is welded against the inner surface of baffle 3. Preferably threshold 5 provided in the upper part of the channel is inclined in the direction of the latter.

Figure 3:
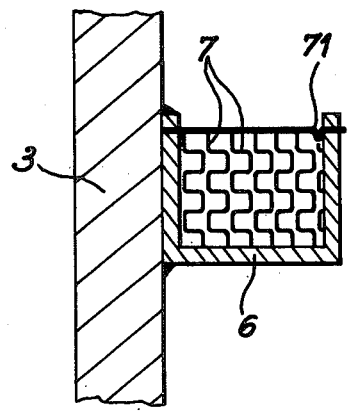
FIG. 3, a cross-sectional view of a variant of the channel according to the invention.

FIG. 3 shows the cross-section of a channel of the type illustrated in FIG. 2 but in which are provided obstacles 7 with respect to the outflow of the sodium removed. In this case the obstacles comprise juxtaposed ribbed metal sheets which are fixed on either side by means of transverse small bars 71 secured to the end of the side walls of the channel.

Figure 4:
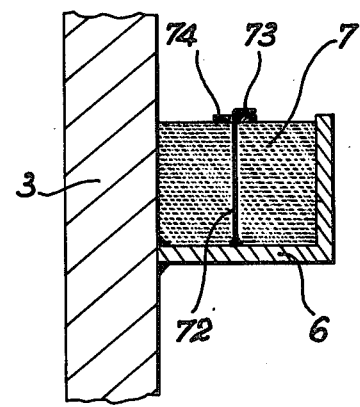
FIG. 4, a cross-sectional view of another variant.

Finally, FIG. 4 shows a variant in which the channel 6 is formed by means of an angle iron welded to the inner wall of baffle 3, the latter forming directly one of the sides of the channel. In this case obstacles 7 are formed by a pile of wire gauzes or fabrics compressed between the bottom of channel 6 and secured by a welded rod 72 whose end 73 is bent against a thrust washer 74.

The slope given to each channel is a function of the effectiveness and shape of obstacle 7 in order to maintain the outflow of cooling sodium such that the sodium flow returned to the second annular space and then to cold collector F does not cause eddies or vortices. In particular a so-called "fluvial" sodium flow is obtained which corresponds to a froude number less than 1. With regard to the fluvial operating conditions which is known in the art reference can be made to the work "Hydraulique Generale et Appliquee", Cartier, Collection of the Centre de Recherches et d'Essais de Chatou, publisher Eyrroles, Paris.

Figure 5:
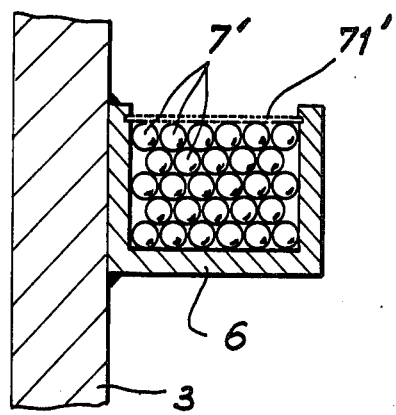
FIG. 5, a cross-sectional view of another variant.

Obviously the invention is not limited to the embodiments specifically described and represented hereinbefore. In particular the obstacles which may be positioned in the channels may comprise shaped or unshaped bodies or can be in the form of particles such as balls or pellets as seen at 7' in FIG. 5 where 71' indicates bars holding the balls or pellets in place.

What is claimed is:

1. Apparatus for cooling the wall of a main vessel of a fast neutron nuclear reactor which surrounds a second inner vessel containing a core and whereby a volume of liquid metal contained in the main vessel is separated into two regions, respectively, a hot collector and a cold collector, whereby the liquid metal drawn into the cold collector and passed through the core into the hot collector is circulated by means of pumps distributed about the core, a baffle and a counter-baffle positioned concentrically to said wall of the main vessel and defining, respectively, a first and second annular space which issue into the cold collector, the first annular space being traversed by a flow of liquid metal which is tapped from the cooling liquid metal circulating from bottom to top in the first space in contact with the wall of the main vessel up to a constant upper level close to the edge of said baffle, channel means for pouring the liquid metal into the second annular space up to a lower level corresponding to the free surface of the cold collector 1 said means being in contact with a wall of the baffle facing the inside of the main vessel, said means providing a flow path for liquid metal from the first annular space into the second annular space.

2. An apparatus according to claim 1, wherein said means are helical channels.

3. An apparatus according to claim 2, wherein the channels are fixed to the wall of the baffle facing the inside of the main vessel.

4. An apparatus according to claim 3, wherein the wall of the baffle facing the inside of the main vessel constitutes a side wall for the channels.

5. An apparatus according to claim 2, wherein the channels contain obstacles in the liquid metal outflow path.

6. An apparatus according to claim 5, wherein the obstacles are a wire gauze and also a wire fabric.

7. An apparatus according to claim 5, the obstacles being shaped members.

8. An apparatus according to claim 5, wherein the obstacles comprise particles such as balls and also pellets.

* * * * *